US005371946A

United States Patent [19]

Cameron et al.

[11] Patent Number: 5,371,946

[45] Date of Patent: Dec. 13, 1994

[54] METHOD OF MAKING THERMALLY-BROKEN EXTRUDED FRAMES FOR WINDOWS AND GLASS DOORS

[75] Inventors: Arthur B. Cameron, 5895 Falcon Road, West Vancouver, British Columbia, Canada, V7W 1W5; Adam T. Marck, Port Moody, Canada

[73] Assignee: Arthur B. Cameron, West Vancouver, Canada

[21] Appl. No.: 156,255

[22] Filed: Nov. 22, 1993

[30] Foreign Application Priority Data

Jul. 30, 1993 [CA] Canada ................................ 2101672

[51] Int. Cl.[5] ....................... B23P 13/00; B23P 17/00; E04C 3/29; E06B 3/26

[52] U.S. Cl. ................................ 29/897.312; 29/418; 29/467; 49/DIG. 1; 52/393

[58] Field of Search .................... 29/281.1, 418, 527.1, 29/527.2, 527.4, 897.3, 897.31, 897.312, 897.32, 467; 49/486, 487, 501, DIG. 1; 52/309.1, 309.13, 309.14, 402, 403, 404, 731, 743; 269/91

[56] References Cited

U.S. PATENT DOCUMENTS

| | | | |
|---|---|---|---|
| Re. 28,084 | 7/1974 | Barker | 29/897.312 X |
| 3,204,324 | 8/1965 | Nilsen | 29/897.312 X |
| 4,069,631 | 1/1978 | Nahr | 52/403 X |
| 4,185,439 | 1/1980 | Bischlipp et al. | 52/731.1 |
| 4,275,526 | 6/1981 | Abramson | 49/DIG. 1 X |
| 4,323,218 | 4/1982 | Plum | 49/DIG. 1 X |
| 4,330,919 | 5/1982 | Bischlipp et al. | 52/403 X |
| 4,342,144 | 8/1982 | Doguchi | 52/731 X |
| 4,447,985 | 5/1984 | Weber et al. | 49/DIG. 1 X |
| 4,688,366 | 8/1987 | Schmidt | 52/731 |
| 4,725,324 | 2/1988 | Schmidt | 49/DIG. 1 X |
| 5,058,351 | 10/1991 | Dunstan | 52/403 |
| 5,072,547 | 12/1991 | DiFazio | 49/DIG. 1 X |
| 5,187,867 | 2/1993 | Rawlings | 29/527.4 X |
| 5,216,810 | 6/1993 | Kendall | 52/309.14 X |

FOREIGN PATENT DOCUMENTS

| | | | |
|---|---|---|---|
| 2831987 | 1/1980 | Germany | 29/897.312 |

*Primary Examiner*—Peter Dungba Vo
*Attorney, Agent, or Firm*—Seed and Berry

[57] ABSTRACT

The present invention relates to games for use on windows and glass doors and methods of making same, and particularly, methods of making a thermally broken window or door frame made from two frame members that are connected by an insulating member. Existing methods of making thermally broken hollow frame members from two frame members either are complex and time consuming and complex or present difficulties in aligning the two frame members prior to pouring the thermal barrier material. The present invention provides the use of a guide to hold the frame members and am elastomersic gasket which forces the frame members tightly inot the guide and seals the liquid-receiving channel. The frame members can then be inverted in the guide and the process repeated to produce a hollow thermally broken frame.

9 Claims, 1 Drawing Sheet

METHOD OF MAKING THERMALLY-BROKEN EXTRUDED FRAMES FOR WINDOWS AND GLASS DOORS

FIELD OF THE INVENTION

The present invention relates to frames for use on windows and glass doors and methods of making same. More particularly, the invention relates to a method of making a thermally broken window or door frame made from two frame members that are connected by an insulating member, and a frame made according to such method.

BACKGROUND OF THE INVENTION

The frame of a window or glass door is typically the most thermally conductive part of the window or door. This is especially true of aluminum frames because aluminum is an efficient thermal conductor. This presents a problem where a temperature differential is to be maintained across the window or glass door. For example, frost or condensation may form on the inside of the window frame. A known method of addressing this problem is to make an aluminum frame in which the inner and outer frame members are connected only by an insulating material and are not otherwise connected. In this way, a thermal break is introduced into the frame that significantly reduces the transmission of thermal energy from the outside surface to the inside surface of the frame.

Previously, thermally broken aluminum frames were constructed by a method sometimes referred to as "pour and cut" which involves pouring an insulating polyurethane material into a channel joining the outside and inside of the extrusion. When the polyurethane has hardened, the connecting aluminum section of the channel is cut or sawn away to create a thermal break. Such a method is illustrated in U.S. Pat. No. 3,204,324 issued Sep. 7, 1965 to Soule Steel Company and U.S. Pat. No. 4,275,526 issued Jun. 30, 1981 to Abramson. However the need to cut away part of the frame member creates a number of practical difficulties. First, the cutting procedure is time consuming and expensive. Second, the frame members must be designed so that a cutting tool can access the connecting portion of the extrusion. This second limitation is particularly important where a hollow extrusion having more than one interconnecting cross-channel is desired. In the latter case, access of the cutting tool to the area of one of the cross channels to be cut away may be obstructed by the other cross-channel. Also in some applications it may be desirable to have the outer and inner surfaces of the frame in different colours, which is not practical using the existing thermal break construction.

U.S. Pat. No. 4,323,218 issued Apr. 6, 1982 to E & E Kaye Limited discloses a method for forming thermally broken hollow extruded frames. The method involve the use of a jig comprised of an expansible tube inserted between the two frame elements. Shoe are formed on the sides of the tube which in turn act as the base of the channels for receiving the poured thermal barrier resin material. Once the material has hardened the tube is contracted and withdrawn. This method is too labour intensive and time consuming to be economical in the production of frames. Another method for forming thermally broken hollow extruded frames is disclosed in U.S. Pat. No. 4,342,144 issued Aug. 3, 1982 to Yoshida Kogyo K.K. According to a prior method disclosed in that patent, a two step method was known for making thermally broken hollow extruded frames from a single piece extrusion by first cutting a slot in the base of one of the channels and covering it with a thermally insulating strip, then introducing the thermal barrier resin into the channel and allowing it to harden. The base of the second channel is then cut, covered with the thermally insulating strip and the resin is poured into the second channel. As pointed out in that patent, this process requires two cutting steps which are time consuming, and further does not address the problem of different colours for the inside and outside of the frame. The particular method involved in that patent still utilizes a single piece extrusion, but requires only a single cutting step.

U.S. Pat. No. 4,725,324 issued Feb. 16, 1988 to Capitol Products Corp. discloses a method of making a dual thermal barrier hollow by joining separate metal shapes with a double-sided adhesive tape and then pouring thermal barrier material into two receiving channels. The difficulty with that method lies in properly aligning the two shapes when taping them together, and the only suggestion to assist in the alignment of the shapes on the tape is the use of angle brackets.

There is therefore a need for a method of making a dual thermal barrier hollow frame by joining separate frame elements rather than cutting a single element in which alignment of the two elements can be done easily and accurately.

SUMMARY OF THE INVENTION

The present invention consists of a method for making a thermally broken frame. The method includes the following steps:

a) providing a hollow, rigid guide member for receiving two elongated extruded frame members and securing same in a desired fixed spatial relationship;

b) seating a first inner frame member in the guide member, the first frame member having a first pair of adjacent upper and lower channels, the first upper and lower channels being open along one side thereof;

c) seating a second frame member in the guide member parallel to and spaced from the first frame member, the second frame member having at least one pair of adjacent upper and lower channels open along one side thereof, whereby the open side of the upper and lower channels in the first member adjacently face and are spaced from the open side of the upper and lower channels in the second member, the respective upper and lower channels of the first and second frame members thereby forming first elongated upper and lower compartments;

d) installing an elastomeric gasket into the lower compartment whereby the gasket is compressed into the compartment and fills the spaces formed between the lower channels of the first and second frame members;

e) introducing a liquid thermal barrier material into the upper compartment;

f) permitting the liquid thermal barrier material to solidify, thereby forming from the first and second frame members a unitary frame member; and g) removing the unitary frame members from the guide.

According to a further aspect of the invention the first and second frame members each have a second pair of adjacent upper and lower channels defining, when the first and second frame members are seated in the guide member, second elongated upper and lower compartments, and the method includes the further steps of;

h) inverting the unitary frame member and replacing it into the guide member; and i) installing an elastomeric gasket into the second lower compartment whereby the gasket is compressed into the second lower compartment and fills the spaces formed between the second lower channels of the first and second frame members;

j) introducing a liquid thermal barrier material into the second upper compartment;

k) permitting said liquid thermal barrier material to solidify; and l) removing the unitary frame members from said guide.

BRIEF DESCRIPTION OF THE DRAWINGS

The invention, as exemplified by a preferred embodiment, is described with reference to the drawing in which.

DETAILED DESCRIPTION OF THE PREFERRED EMBODIMENT

Figure 1A:
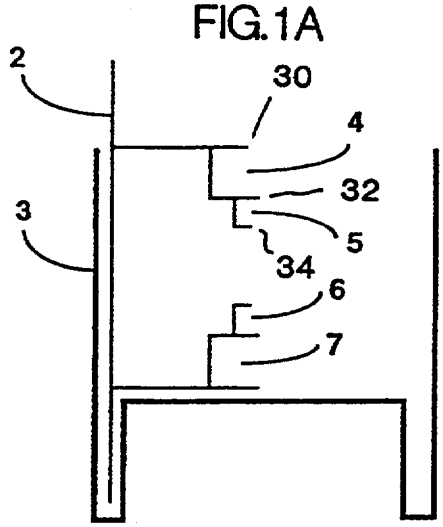
FIGS. 1A through 1F are transverse cross-sectional drawings illustrating the construction of a thermally broken frame by the process of the present invention.

Referring to the drawings, in FIG. 1A, a first inner frame member 2 is seated in a elongated hollow guide or cradle 3. Frame member 2, shown in transverse cross-section, is preferably an aluminum extrusion of variable length as preferred currently in the construction of window frames. Cradle 3 may also be an aluminum extrusion, or of other construction. Inner frame member 2 has a top pair of adjacent channels 4, 5 and a bottom pair of adjacent channels 6, 7. The fit between cradle 3 and frame member 2 is a slide fit so the cradle 3 holds the frame member securely in place to facilitate the subsequent steps of the method.

Figure 1B:
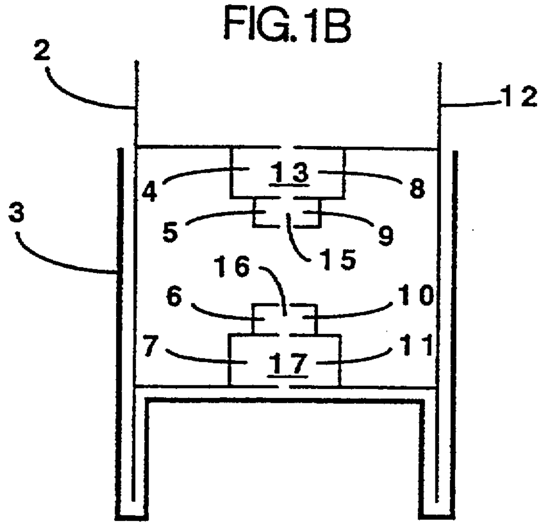

In FIG. 1B, an outer frame member 12 is next seated in cradle 3 parallel to the inner frame member 2. The outer frame member 12 is a mirror image of inner frame member 2, again preferably an aluminum extrusion of variable length and has a top pair of adjacent channels 8,9 and a bottom pair of adjacent channels 10, 11. Inner and outer frame members 2, 12 may be of different colours as desired. Again there is a slide fit between cradle 3 and frame member 12. Cradle 3 is configured such that when the inner and outer frame members 2, 12 are seated in the cradle 3, there is a gap of approximately $\frac{1}{4}$ of an inch between the edges of flanges 30, 32 and 34 and the corresponding edges of flanges 31, 33 and 35. Similar gaps are formed in respect of channels 16 and 17. There is very little transverse movement of the frame members 2, 4 while in the cradle 3. The ends of cradle 3 are open, so that the frame members will extend slightly beyond the ends of the cradle. The frame members will be cut to length at the end of the process.

As shown in FIG. 1, the channels on the outer frame member 8, 9, 10, 11 are opposite and aligned with the complementary channels 4, 5, 6, 7 in the inner frame member 2 when the two frame members are in place in the cradle 3. As a result, the complementary channels of the two frame members define larger channels 13, 15, 16, and 17 between the frame members 2 and 12. Channels 5, 6, 9 and 10 are preferably rectangular in cross-section as shown in the drawings but may also be semi-circular or "C"-shaped.

Figure 1C:
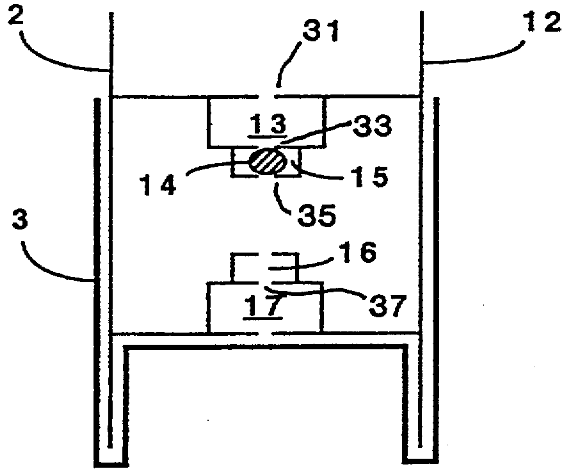

As shown in FIG. 1C, a rubber gasket or spacer 14 is then installed in channel 15 to seal the gap between flanges 32 and 33. Rubber gasket 14 is preferably constructed of a chemically cured rubber such as neoprene, EPDM or similar substance such as polyvinyl chloride and is round in cross-section, with a diameter greater than the gaps formed between flanges 32, 33 and the corresponding gap 37 between channels 16 and 17. The rubber gasket is installed in channel 15 preferably using a roller designed specifically for this application. It has a handle with a roller disc of about 1 and $\frac{1}{2}$ inches in diameter and slightly less than $\frac{1}{4}$ inch thickness mounted for rotation on an axle. In this way the edge of the disc can extend into the gap between edges 32, 33 to force the rubber gasket into channel 15 under compression. The rolling action permits a long length of the gasket to be quickly installed and thereby seal the gap between edges 32 and 33. The compression of gasket 14 in channel 15 also causes the frame members 2, 12 to expand outwardly against the walls of cradle 3 and to be tightly held in place in cradle 3.

Figure 1D:
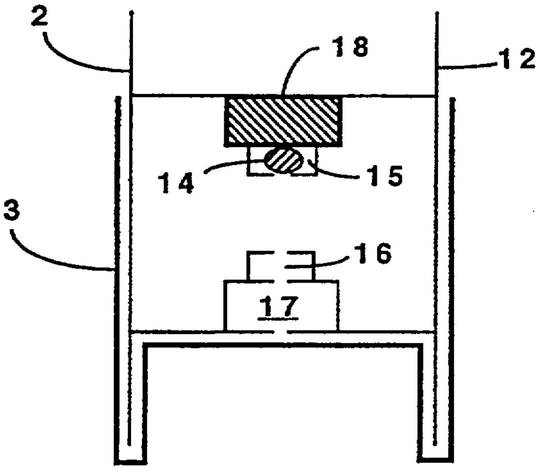

As shown in FIG. 1D, after the rubber gasket 14 is installed a liquid thermal barrier material 18 such as a polyurethane polymer resin is injected or poured into the upper channel 13 defined by the gasket 14 and the top pair of adjacent channels on the frame members 4, 5, 8, 9. The gasket 14 seals off one side of the channel 13 into which the material 18 is injected. The thermal barrier material is then allowed to harden or cure.

Figure 1E:
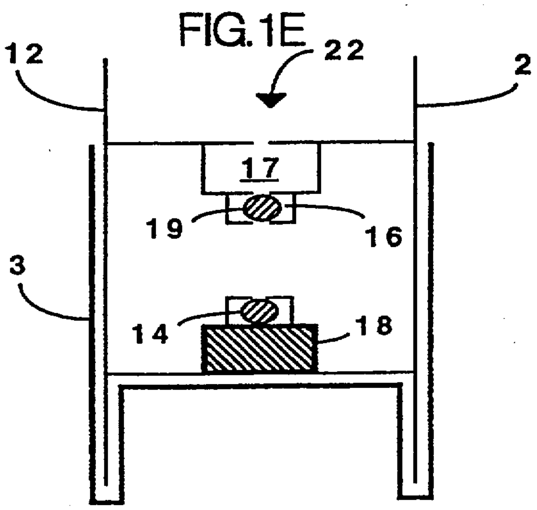

Referring to FIG. 1E, the two frame members 2, 12 now form a unitary frame 22 connected by thermal barrier 18. Frame 22 is now slid out of cradle 3 and turned up-side down in the cradle 3 so that the bottom pair of channels 16, 17 now lie above channels 13, 15. A second rubber gasket 19 is installed under compression into channel 16 defined by the bottom pair of adjacent channels 6, 7, 10, 11 in the same manner as was gasket 14.

Figure 1F:
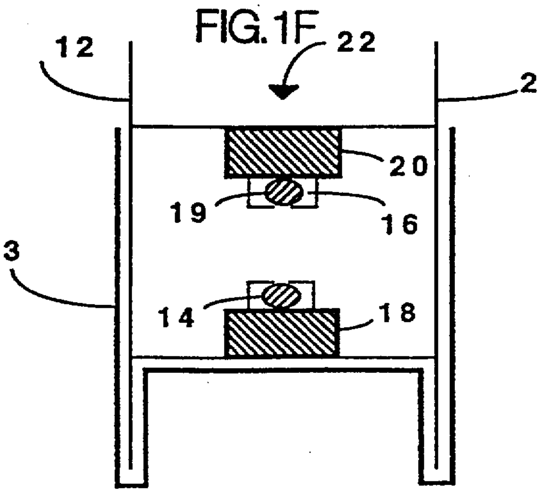

As shown in FIG. 1F, liquid thermal barrier material 20 is again poured or injected into channel 17 the lower surface of which is now sealed by gasket 19. The thermal barrier material 20 is then similarly allowed to harden or cure, and the finished frame can be removed from cradle 3 and cut to length. In this way a thermally broken hollow frame has been constructed.

While the use of the cradle 3 and rubber gaskets 14, 19 has permitted rapid alignment of the two frame members, in some instances it has been found that a slight bow or curvature may be present along the length of the two frame members 2, 12 and so in some applications it may be necessary to force the two members into vertical alignment and use a retaining clip during these procedures.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of making a thermally broken frame, comprising the steps of:

a) providing a hollow, rigid guide member for receiving two elongated extruded frame members and securing said two elongated extruded frame members in a fixed spatial relationship;

b) seating a first one of said elongated extruded frame members in said guide member, said first frame member comprising a first pair of adjacent upper and lower channels, said first pair of upper and lower channels being open along one side of said first frame member;

c) seating a second one of said elongated extruded frame members in said guide member parallel to and spaced from said first frame meter, said second frame member comprising a first pair of adjacent upper and lower channels open along one side of said second frame member, whereby said open side of said upper and lower channels in said first member opposingly face and are spaced from said open side of said upper and lower channels in said second member, the respective upper and lower channels of said first and second frame members thereby forming first elongated upper and lower compartments separated by an elongated opening therebetween;

d) installing an elastomeric gasket into said lower compartment whereby said gasket is compressed into said compartment and seals said elongated opening between said first elongated upper and lower e) introducing a liquid thermal barrier material into said first upper compartment to substantially fill said upper compartment with said liquid thermal barrier material;

f) permitting said liquid thermal barrier material to solidify, thereby securing said first frame member to said second frame member to form a unitary thermally broken frame; and g) removing said unitary thermally broken frame from said guide member.

2. The method as defined by claim 1 wherein said first and second frame members are aluminum extrusions.

3. The method as defined by claim 1 wherein said elastomeric gasket is circular in cross-section.

4. The method as defined by claim 1 wherein said elastomeric gasket is formed of a chemically cured rubber.

5. The method as defined by claim 1 wherein said elastomeric gasket is formed of a polyvinyl chloride.

6. The method as defined by claim 1, wherein said first and second frame members each comprise a second pair of adjacent upper and lower channels defining, when said first and second frame members are formed into a unitary thermally broken frame, second elongated upper and lower compartments separated by an elongated opening therebetween, and comprising the further steps of:

h) inverting said unitary thermally broken frame and replacing it into said guide member;

i) installing an elastomeric gasket into said second lower compartment whereby said gasket is compressed into said second lower compartment and seals said elongated opening between said second elongated under and lower compartments;

j) introducing a liquid thermal barrier material into said second upper compartment to substantially fill said second upper compartment with said liquid thermal barrier material;

k) permitting said liquid thermal barrier material to solidify; and l) removing said unitary thermally broken frame from said guide member.

7. The method as defined by claim 6 wherein said first and second frame members are aluminum extrusions.

8. The method as defined by claim 2 wherein said elastomeric gasket is circular in cross-section.

9. The method as defined by claim 2 wherein said elastomeric gasket is formed of a chemically cured rubber.

* * * * *

UNITED STATES PATENT AND TRADEMARK OFFICE

CERTIFICATE OF CORRECTION

PATENT NO. : 5,371,946

DATED : December 13, 1994

INVENTOR(S) : Arthur B. Cameron and Adam T. Marck

It is certified that error appears in the above-indentified patent and that said Letters Patent is hereby corrected as shown below:

In column 5, claim 1, line 9, please delete "meter" and substitute therefor --member--.

In column 6, claim 6, line 22, please delete "under" and substitute therefor --upper--.

Signed and Sealed this

Fourth Day of July, 1995

Attest:

BRUCE LEHMAN

*Attesting Officer* — *Commissioner of Patents and Trademarks*